(12) United States Patent
Oster

(10) Patent No.: US 11,070,283 B2
(45) Date of Patent: Jul. 20, 2021

(54) SYSTEM FOR CALIBRATING FROM THE GROUND A PAYLOAD OF A SATELLITE

(71) Applicant: THALES, Courbevoie (FR)

(72) Inventor: Yann Oster, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/812,095

(22) Filed: Mar. 6, 2020

(65) Prior Publication Data

US 2020/0287620 A1    Sep. 10, 2020

(30) Foreign Application Priority Data

Mar. 7, 2019   (FR) ...................................... 1902216

(51) Int. Cl.
  *H04B 17/21*   (2015.01)
  *H04B 7/185*   (2006.01)
  *H04B 7/08*    (2006.01)

(52) U.S. Cl.
  CPC ....... *H04B 7/18519* (2013.01); *H04B 7/0894* (2013.01); *H04B 7/18515* (2013.01)

(58) Field of Classification Search
  CPC .............. H04B 7/18519; H04B 7/0894; H04B 7/18515; H04B 17/12; H04B 17/0085;
  (Continued)

(56) References Cited

U.S. PATENT DOCUMENTS

| 5,572,219 A | 11/1996 | Silverstein et al. |
| 5,861,843 A * | 1/1999 | Sorace ................... H01Q 3/267 342/174 |

(Continued)

FOREIGN PATENT DOCUMENTS

| EP | 2 371 072 A1 | 10/2011 |
| EP | 2 371 075 A1 | 10/2011 |

(Continued)

OTHER PUBLICATIONS

Wang, (IDS) A Low complexity calibration method for spaced-borne phased array antennas, 2016 (Year: 2016).*

(Continued)

*Primary Examiner* — Dong-Chang Shiue
(74) *Attorney, Agent, or Firm* — BakerHostetler

(57) ABSTRACT

A system for calibrating a payload of a satellite, the payload includes a multichannel transmitter or receiver comprising an antenna, one analogue processing chain per channel and a set of digital integrated circuits, the system comprising a calibration device configured to: acquire for all the channels of the transmitter or of the receiver, a digitized calibration signal, set a reference channel and, for each of the other channels, determine a relative complex gain between the channel and the reference channel, for a plurality of frequencies of the calibration signal, correct the relative complex gain of a relative gain of the antenna of the satellite between the channel and the reference channel, estimate a relative delay, estimate a relative phase difference for the set of frequencies, deliver a correction of the relative gain, phase difference and delay of the channel with respect to the reference channel for a set of frequencies.

16 Claims, 10 Drawing Sheets

(58) Field of Classification Search
CPC ........ H04B 17/21; H01Q 3/005; H01Q 3/267; H01Q 1/125
See application file for complete search history.

(56) References Cited

U.S. PATENT DOCUMENTS

| | | | | |
|---|---|---|---|---|
| 7,825,852 | B2* | 11/2010 | Wooldridge | H04B 17/21 342/165 |
| 2010/0164782 | A1* | 7/2010 | Saha | H04B 7/18519 342/174 |
| 2016/0156100 | A1* | 6/2016 | Sikina | H01Q 3/267 342/352 |
| 2017/0288853 | A1* | 10/2017 | Oster | H04B 7/18519 |
| 2018/0034541 | A1* | 2/2018 | Chen | H04B 17/21 |
| 2019/0173443 | A1* | 6/2019 | Elwailly | H04B 17/0085 |

FOREIGN PATENT DOCUMENTS

| | | |
|---|---|---|
| EP | 2 555 016 A1 | 2/2013 |
| EP | 3 229 383 A1 | 10/2017 |
| WO | 2010/060953 A1 | 6/2010 |
| WO | 2010/076290 A1 | 7/2010 |
| WO | 2014/169934 A1 | 10/2014 |

OTHER PUBLICATIONS

Wang, et al., "A Low Complexity Calibration Method for Spaceborne Phased Array Antennas", Beijing Institute of Technology, 2016.

Pierre, et al., "Experimental performance of calibration and direction-finding algorithms", Department of Electrical Engineering University of Minneapolis, 1991.

* cited by examiner

SYSTEM FOR CALIBRATING FROM THE GROUND A PAYLOAD OF A SATELLITE

CROSS-REFERENCE TO RELATED APPLICATIONS

This application claims priority to foreign French patent application No. FR 1902216, filed on Mar. 7, 2019, the disclosure of which is incorporated by reference in its entirety.

FIELD OF THE INVENTION

The invention relates to the field of calibration of a satellite payload in orbit from the ground. It relates to a calibration system and method for a payload performing a beam-forming function in reception-mode and/or in transmission-mode. The objective of the calibration is to pair the processing chains associated with each transmission or reception channel of the payload.

BACKGROUND

The technical problem addressed by the present invention is that of pairing transmission or reception channels of a satellite payload, covering both the analogue processing chains and the digital processing chains.

The need relates to payloads on board satellites, in particular telecommunication satellites, which payloads are confronted with daily variations in temperature and with ageing over lifetimes that may exceed fifteen years.

The active antennas of satellites use a high number of radiofrequency analogue chains (typically about a few tens to a few hundred) the frequency responses of which must be paired in order not to degrade their performance in terms of directivity, and of signal-to-interference ratio in the case of multi-beam coverage with frequency reuse. The frequency responses of the radiofrequency chains vary with temperature and drift because of ageing.

Furthermore, as a result of increases in processed frequency bandwidth, for wide-band applications (frequency band exceeding for example 500 MHz), digital beamforming, which is carried out in digital equipment located downstream (for a reception-mode antenna) or upstream (for a transmission-mode antenna) of the analogue radiofrequency chains, is confronted with dispersion in latencies on the digital channels. With the increase in the sampling frequency of analogue-to-digital and digital-to-analogue converters, it is increasingly difficult to guarantee that the signals of the various analogue radiofrequency chains will be sampled synchronously, because of the dispersion in the distribution of the signals, of the clocks and of the dispersion in the aperture time of the converters. Because of their complexity, the digital processing operations are generally distributed between a plurality of integrated circuits employing clock dividers that may induce phase ambiguities in the clock signals. Moreover, the integrated circuits are optionally interfaced with one another via fast serial interfaces (high speed serial links) also involving clock dividers and the latency of which may be indefinite on each power-on. These hardware constraints induce disparities in latency between the digital processing channels. This dispersion in latency must be compensated for to ensure a good performance is obtained.

Thus, there is a need to conjointly estimate and correct errors in the analogue and digital chains of various processing channels of a satellite payload performing a beam-forming function.

Generally, known techniques treat the calibration of the analogue radiofrequency chains and of the antenna but not latency and synchronization impairments induced by the digital portion of the channels of the payload.

The prior art contains various solutions for calibrating payloads from the ground.

A first solution, which is described in United States patent application U.S. Pat. No. 5,572,219, relates to a satellite equipped with a transmitting antenna array and a separate transmission channel for transmitting a reference signal. The reference signal and the calibration signal are generated coherently. The various radiating elements of the antenna transmit the calibration signal, which is coded beforehand with orthogonal sequences in order to be able to differentiate between them on the ground. The orthogonal sequence specific to each radiating element is alternatively inverted (polarity), this being equivalent to 0/180° phase modulation. The processing of the signal received by a ground station, i.e. of the reference signal and of the coded signals output from the radiating elements of the antenna array, allows estimating the gain and phase of each radiating element.

The above solution has the following drawbacks. It cannot be applied to a reception-mode antenna. It requires the telecom service provided by the satellite to be interrupted. It does not address the problems of frequency-dependent dispersion between the analogue chains, of latency differentials within the digital functions, of synchronization impairments of the digital-to-analogue converters. It requires specific electronics and antenna for transmitting a reference signal. It assumes the digital processing operations used to coherently generate the orthogonal sequences are perfectly synchronous, in order to guarantee the orthogonality of the signals at reception and to minimize the inter-correlation between these coded signals.

The article "A low complexity calibration method for space-borne phased array antenna" by Shuai Wang 2016 describes the case of a transmission antenna. All the radiating elements of the antenna are excited with the same calibration signal, which is spread using pseudo-random noise PN (pseudo-noise) sequences that are radiating-element specific, in order to make it possible to separate the signals on the ground. In practice, different sub-sequences, drawn from a given PN sequence by shifting, are used instead of separate PN sequences in order to simplify the PN synchronization on the ground. This allows the measurements on the radiating elements to be carried out in parallel, but the measurement duration is increased by the length of the sequences. The PN sequences allow the signals to be correctly separated during despreading when they are not synchronous.

This solution has the following drawbacks. It does not address the issues of frequency-dependent dispersion between the analogue chains, of latency differentials within the digital functions, of synchronization impairments of the digital-to-analogue converters. Since the PN sequences are not strictly orthogonal, separation of each signal is penalized by interference due to the other signals.

Another solution, described in patent application U.S. Pat. No. 7,825,852, relates to a satellite equipped with two antenna arrays that transmit and receive, respectively. This method consists in modulating by 0°/180° the phase of each radiating element (of the first antenna, then of the second antenna) in turn without interrupting the telecom service provided. During the calibration, a single radiating element is affected by the calibration signal, which results in a very marginal degradation of the telecom service provided in the case of an antenna array. The ground station, which transmits and receives the signal, is coupled to a computer that analyses the impact of the modulation on the various radiating elements, in order to determine the gain and phase of each radiating element. The frequency of the calibration signal is chosen to not interfere with the useful signal. The compensation estimated for the frequency of the calibration signal is extrapolated to apply to the frequency of the useful signal.

This solution does not solve the problems of frequency-dependent dispersion between the analogue chains, of latency differentials within the digital functions, of synchronization impairments of the analogue-to-digital and digital-to-analogue converters.

Algebraic techniques are known for pairing analogue radiofrequency chains using analogue-to-digital converters (ADC), assuming a synchronous operation (same frequency and same clock phase at a given conversion time on all the converters). For example, various algebraic techniques are mentioned in the article "experimental performance of calibration and direction-finding algorithms" by Pierre & Kaveh—1991. They consist in synchronously digitizing the signals of the radiofrequency channels, in order to estimate the correlation matrix, which is then decomposed into a basis of eigenvectors, this allowing the directions of arrival to be estimated. Optimizations of least-squares type allow the complex coefficients corresponding to the (amplitude, phase) errors in the RF analogue channels to be estimated.

However, these techniques apply solely to the case of a digital processor with perfectly synchronous sampling and coherent processing, and to reception-mode antennas. They do not address the issue of frequency-dependent dispersion between the analogue chains.

SUMMARY OF THE INVENTION

The invention provides a global calibration technique addressing jointly the impairments resulting from analogue and digital processing channels of a payload, both for transmission-mode operation and reception-mode operation.

Specifically, the invention has the following advantages. It allows to estimate the combined effect of impairments induced by analogue and digital channels. These impairments relate to differences, in terms of delay, of gain and of phase, between the channels, in the useful frequency band. Analogue-related impairments are caused by the behaviour of the radiofrequency chains, by distribution skews associated to signals and clocks distributions to converters, between chains, or even by differences in the aperture times of the analogue-to-digital or digital-to-analogue converters. Digital-related impairments are caused by differences in latency between digital channels, for example because of phase ambiguities in the clock dividers, or due to indefinite latency in the asynchronous interfaces between the integrated circuits.

The proposed solution is without significant impact on the payload, in particular on its cost, its weight or its power consumption.

It allows the calibration processing to be carried out on board the satellite or on the ground.

It is based on differential measurements that are not dependent on the propagation conditions of the links between the ground and the satellite.

It allows to calibrate all the processing channels on the entire useful frequency band.

Lastly, it allows the calibration to be achieved simultaneously with the service provided by the satellite.

One subject of the invention is a system for calibrating a payload of a satellite, the payload comprising a multichannel transmitter or receiver comprising an antenna, one analogue processing chain per channel and a set of digital integrated circuits, the system comprising a calibration device implemented in the payload or in a ground station, the calibration device being configured to:
  acquire for all the channels of the transmitter or of the receiver, a digitized calibration signal,
  set a reference channel and, for each of the other channels,
    determine a relative complex gain between the channel and the reference channel, for a plurality of frequencies of the calibration signal,
    correct the relative complex gain of a relative gain of the antenna of the satellite between the channel and the reference channel,
    estimate, from the phase of the relative complex gain, which phase is evaluated for a set of frequencies, a relative delay,
    estimate, from the phase of the relative complex gain, which phase is evaluated for a set of frequencies, and from the relative delay, a relative phase difference for the set of frequencies,
    deliver a correction of the relative gain, phase difference and delay of the channel with respect to the reference channel for a set of frequencies.

According to a first particular variant of the invention, the payload comprises a multi-channel receiver and the calibration device is configured to receive, for each reception channel, a digitized sample sequence of a calibration signal received by the satellite, the sample sequence being acquired in the set of digital integrated circuits in all of the channels, the sample sequence being acquired in a given time interval for at least one subset of the channels.

According to one particular aspect of the first variant of the invention, the calibration device is implemented in the ground station, the system furthermore comprising the payload, the payload being configured to receive a calibration signal, the set of digital integrated circuits being configured to acquire, for each channel, the digital sample sequence of the calibration signal and to correct the relative gain, phase and delay of the channel with respect to the reference channel.

According to one particular aspect of the first variant of the invention, the set of digital integrated circuits comprises a subset of digital integrated circuits performing a beam-forming function for at least some of the channels, the set of digital integrated circuits being configured to acquire the digital sample sequence of the calibration signal in the last digital integrated circuit of the subset in the direction of propagation of the signal.

According to a second particular variant of the invention, the payload comprises a multichannel transmitter, the calibration device being implemented in the ground station and furthermore being configured to separate the calibration signal received on the ground into a plurality of channels corresponding to the transmission channels of the satellite.

According to one particular aspect of the second variant, the calibration system furthermore comprises the payload, the payload being configured to:
  generate the calibration signal in the set of digital integrated circuits,
  transmit the calibration signal from the satellite to the ground station,
  correct, in the set of digital integrated circuits, the relative gain, phase and delay of the channel with respect to the reference channel.

According to one particular aspect of the second variant of the invention, the set of digital integrated circuits comprises a subset of digital circuits performing a beam-forming function for at least some of the channels, the set of digital integrated circuits being configured to generate the calibration signal in the first digital integrated circuit of the subset in the direction of propagation of the signal.

According to one particular aspect of the second variant of the invention,
- the payload is furthermore configured to generate at least two auxiliary signals each comprising at least one frequency carrier different from the frequencies of the calibration signal and different from the frequencies of the other auxiliary signals, an auxiliary signal being generated from the calibration signal and from another auxiliary signal,
- the calibration device is configured to:
- for each channel other than the reference channel, receive the at least two auxiliary signals transmitted on the reference channel and the calibration signal transmitted on the channel, generate a reference signal of frequencies identical to the frequencies of the calibration signal, the reference signal being generated from the at least two received auxiliary signals, and determine a relative complex gain between the received calibration signal and the reference signal.

According to one particular aspect of the second variant of the invention, the calibration device is furthermore configured to, in a prior step:
- receive the at least two auxiliary signals and the calibration signal transmitted on the reference channel,
- generate a first reference signal of frequencies identical to the frequencies of the calibration signal, the reference signal being generated from the at least two received auxiliary signals,
- determine a corrective relative complex gain between the calibration signal received in the prior step and the first reference signal,
- for each channel other than the reference channel, correct the relative complex gain using the corrective relative complex gain.

According to one particular aspect of the invention, the calibration signal is composed of a plurality of frequency carriers.

The invention also relates to a method for calibrating a payload of a satellite, the payload comprising a multichannel transmitter or receiver comprising an antenna, one analogue processing chain per channel and a set of digital integrated circuits, the method comprising the steps of:
- acquire for all the channels of the transmitter or of the receiver, a digitized calibration signal,
- set a reference channel and, for each of the other channels,
  - determine a relative complex gain between the channel and the reference channel, for a plurality of frequencies of the calibration signal,
  - correct the relative complex gain of a relative gain of the antenna of the satellite between the channel and the reference channel,
  - estimate, from the phase of the relative complex gain, which phase is evaluated for a set of frequencies, a relative delay, estimate, from the phase of the relative complex gain, which phase is evaluated for a set of frequencies, and from the relative delay, a relative phase difference for the set of frequencies,
  - deliver a correction of the relative gain, phase difference and delay of the channel with respect to the reference channel for a set of frequencies.

DETAILED DESCRIPTION

Figure 1:
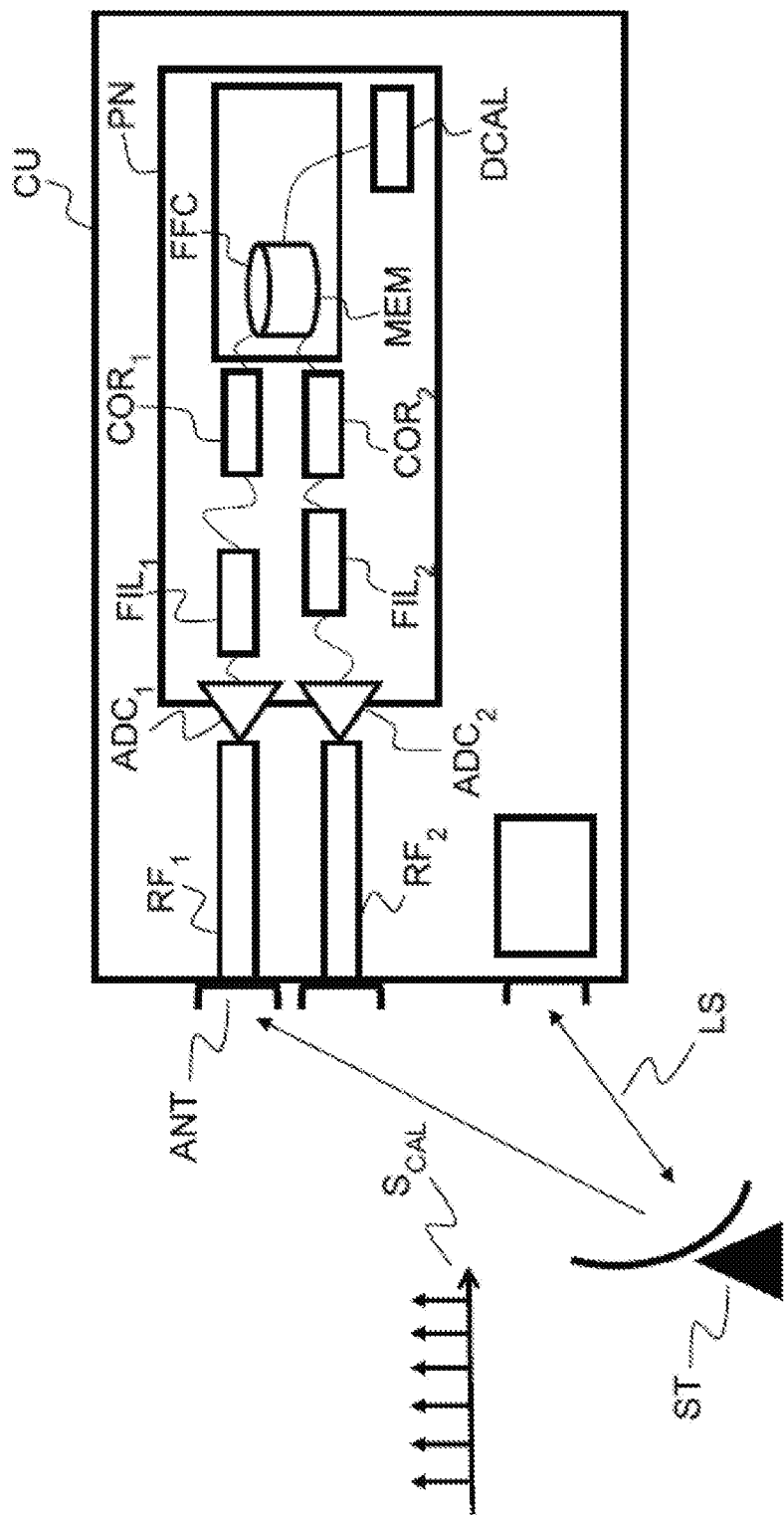
FIG. 1 shows a schematic of a system for calibrating a payload of a satellite having a receiving antenna according to a first embodiment of the invention.
Figure 2:
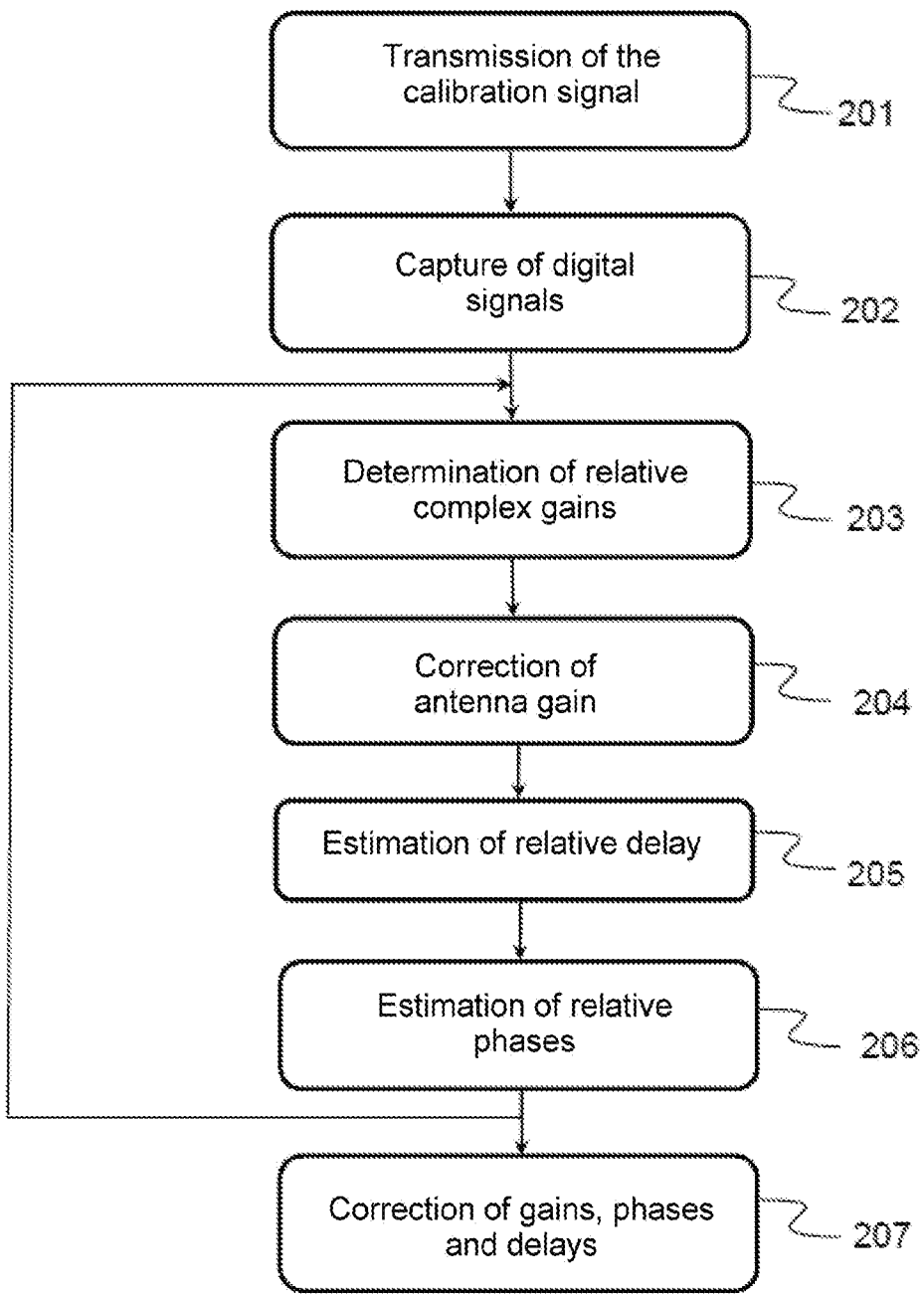
FIG. 2 shows a flowchart detailing the steps of a method for calibrating the system of FIG. 1 according to one embodiment of the invention.

FIGS. 1 and 2 illustrate the implementation of a system and method for calibrating a payload of a satellite in orbit according to a first embodiment of the invention, in which embodiment the antenna of the satellite operates as a receiving antenna.

The calibration method according to the invention is executed in part by one (or more than one) ground stations ST and in part by the payload CU of a satellite in orbit. The ground station ST in particular comprises an antenna pointed towards the satellite, a transmitting and receiving chain for communicating with the satellite, and an analogue-to-digital and digital-to-analogue converter. In the case where the calibration method is implemented on the ground, the ground station ST or another piece of equipment that is located remotely and interfaced with the ground station ST comprises at least one means for communicating with the satellite via a secure link LS, a memory for storing the digitized received signal and a computing device for processing the signal. The payload CU comprises one or more antennas ANT or an antenna array made up of a plurality of radiating elements. Each radiating element receives a signal that is processed in the payload CU by a processing channel. The payload CU thus operates in a multi-channel mode. In FIG. 1 a payload comprising two reception channels has been shown, but the number of channels is in general higher. One objective of the calibration is to achieve a pairing of the reception channels that takes into account both the analogue and digital processing operations. In other words, one objective of the calibration is to estimate the relative errors in gain, phase and delay between the various channels in order to correct them so as to obtain a precise pairing of the channels with one another.

Each processing channel comprises an analogue radiofrequency chain $RF_1, RF_2$ that consists of one or more filters, one or more amplifiers and optionally one or more mixers for transposing the frequency of the received signal.

At the output of each analogue reception radiofrequency chain, a digital-to-analogue converter $ADC_1, ADC_2$ is positioned to convert the analogue signals into digital signals that are delivered to a set of digital integrated circuits PN. Each digital integrated circuit is, for example, an application-specific integrated circuit (ASIC) or a field-programmable gate array (FPGA) or a set of logic gates or even a signal processor or a generic processor.

The set of digital integrated circuits PN for example comprises one digital filter $FIL_1, FIL_2$ per processing channel and a beam-forming circuit FFC, which performs a beam-forming function common to all the processing channels. The function of the beam-forming circuit FFC is in particular to linearly combine the received signals with a set of particular complex gains (amplitude and phase) in order to form at least one beam in the desired direction, relative to a reference direction of the antenna, and receive the useful signals. The particular combination of the received signals with the complex gains constitutes a combination law or beam-forming law.

The example of FIG. 1 is given purely by way of illustration and nonlimitingly. In particular, the set of digital integrated circuits may have a modular architecture different from that of FIG. 1. For example, it may comprise a plurality of series of digital integrated circuits for each channel or a plurality of beam-forming integrated circuits operating in parallel and in cascade for subgroups of channels.

In any given architecture, the set of digital integrated circuits comprises a means MEM for coherently capturing or storing the digital signals of each channel, in the last digital integrated circuit that finalizes the reception-mode beam forming, or in a section of a subset of integrated circuits that operate coherently, this subset of circuits including the last circuit that finalizes the beam forming. The term "coherent" here refers to an iso-latency between channels, from the section of integrated circuits operating coherently and up to the output of the beam-forming function. In other words, the processing operations carried out downstream the output from the set of integrated circuits in which the digital signals are acquired, have an iso-latency between the various reception channels up to the finalization of the beam forming. In the example of FIG. 1, the last digital integrated circuit that finalizes the reception-mode beam forming is the single beam-forming circuit FFC. The capturing means may consist in a memory or any other equivalent means MEM that allows to save the digital signals input into the module FFC. The function of the means MEM is for example to store in memory the input signals of a circuit FFC, or to store in memory the signals output from a set of beam-forming functions that simultaneously and synchronously process the same signals to form various beams. Suitably programming the beam-forming laws allows to propagate any input signal of a digital channel to an input of the last circuit FFC or to an output of a beam-forming function. The signals either of all the digital channels, as in FIG. 1, or of subsets of channels, can then be coherently stored in memory while sharing a common reference channel.

The calibration method according to the invention is implemented in a digital calibration device DCAL that receives the digital signals acquired by the means MEM. The digital calibration device DCAL is implemented either in the set of digital integrated circuits PN on board the satellite or else in a ground station ST that is the one used to generate and transmit the calibration signal or another ground station.

The calibration method starts with the transmission 201 of a calibration signal $S_{CAL}$ by a ground station ST to the satellite, which receives this signal. The calibration signal contains carriers, which are modulated by a predefined signal or not modulated, in the entire useful frequency band of the receiving satellite antenna ANT. For example, the calibration signal is composed of a plurality of carriers that are spaced apart, preferably regularly, in the useful frequency band of the system.

The modulation of the calibration signal by a known sequence (via a spread-spectrum technique) allows the calibration signal to be separated in the presence of the useful signal, with the possibility of decreasing the power of the calibration signal in order to reduce the impact on the useful signal.

Advantageously, the frequency step $\Delta f$ between two adjacent carriers of the calibration signal is smaller than or equal to a threshold corresponding to a phase rotation of $\pi$ for a maximum relative delay $\Delta_T$ and given by the following relationship:

$$\Delta f = \frac{\pi}{2\pi * \Delta \tau} = \frac{1}{2 \Delta \tau} \qquad \text{[Math. 1]}$$

The calibration signal is received by the antenna ANT, passes through the analogue and digital processing chains of each channel and is captured 202 by the memory MEM at the input (or at the output) of the last FFC digital integrated circuit, this being done coherently for all of the channels or in subsets.

The following steps of the calibration method consist in estimating the impairments between the processing channels on the basis of the captured digital signals. In other words, it is a matter of estimating the relative impairments between each channel and a reference channel, these impairments being estimated in gain, phase and delay. The steps of estimating these discrepancies may be executed on board the satellite, by an additional digital integrated circuit or a computer, or indeed by a ground station ST (which may be the same station that is tasked with the transmission of the calibration signal or a different station (not shown in FIG. 1)). In this second case, the digital signals captured in the memory MEM are transmitted to the ground station ST via a protected digital link LS, for example by means of an error correcting code. In any case, the digital signals are acquired at a given time interval. In one variant embodiment, the digital signals are acquired at a given time interval for a subgroup of channels. For example, all of the channels are decomposed into a plurality of subgroups of channels and the digital signals are captured successively in each of the subgroups of channels, at various successive time intervals.

Among all the processing channels, one reference channel is set arbitrarily—the first channel for example. Below, the relative gain, the relative delay and the relative phase difference introduced between the processing channel of index k and the reference processing channel will be denoted $G_k/1$, $T_k/1$ and $d\varphi_k/1$, respectively. In a step 203, for each processing channel k other than the reference channel, a relative complex gain $G_k/1 . e^{j\varphi k/}1$, characterizing this channel with respect to the reference channel, is firstly estimated. Step 203 is carried out for each carrier frequency of the calibration signal. To this end, a prior step of filtering the digital signal about each carrier frequency is carried out. The relative complex gain is determined by performing a computation of the intercorrelation between the digital signal of the reference channel and the digital signal of another channel. Specifically, since the calibration signal is propagated identically on each channel, the result of the intercorrelation of the signals allows to derive a relative complex gain that bears, for each frequency, the relative gain and phase between the two processing channels. This relative gain results from differences induced by the analogue and digital components of the two channels in terms of gain, phase and delay. The computation of the intercorrelation is, for example, carried out either directly in the time domain via a computation of correlation, or indirectly in the frequency domain by means of two direct Fourier transforms, a complex conjugation, a complex multiplication and an indirect Fourier transform, using techniques known to those skilled in the art.

At the end of step 203, for each carrier frequency of the calibration signal and for each processing channel (other than the reference channel), a relative complex gain with respect to the reference channel is obtained.

Next, the relative gains are corrected, in a step 204, for the differential in gain of the antenna between the reference channel and the processing channel. It will be noted that this correcting step may also be carried out before the step 203, directly on the digital signals. The gain of the antenna is determined, for each antenna element, from the direction of arrival of the signal relative to a reference direction of the antenna and from the frequency. The gain of the antenna for each antenna element is, for example, determined using a model of the transfer function of the antenna depending on the frequency and on the direction of arrival of the signal.

After step 204, a set of relative complex gains characterizing the behaviour of the various analogue and digital channels for each carrier frequency of the calibration signal is obtained. The frequency response in gain of a chain of index k relative to the reference chain is defined by the modulus of the complex gain $G_{k/}1$ for the various frequencies of the calibration signal.

Figure 3:
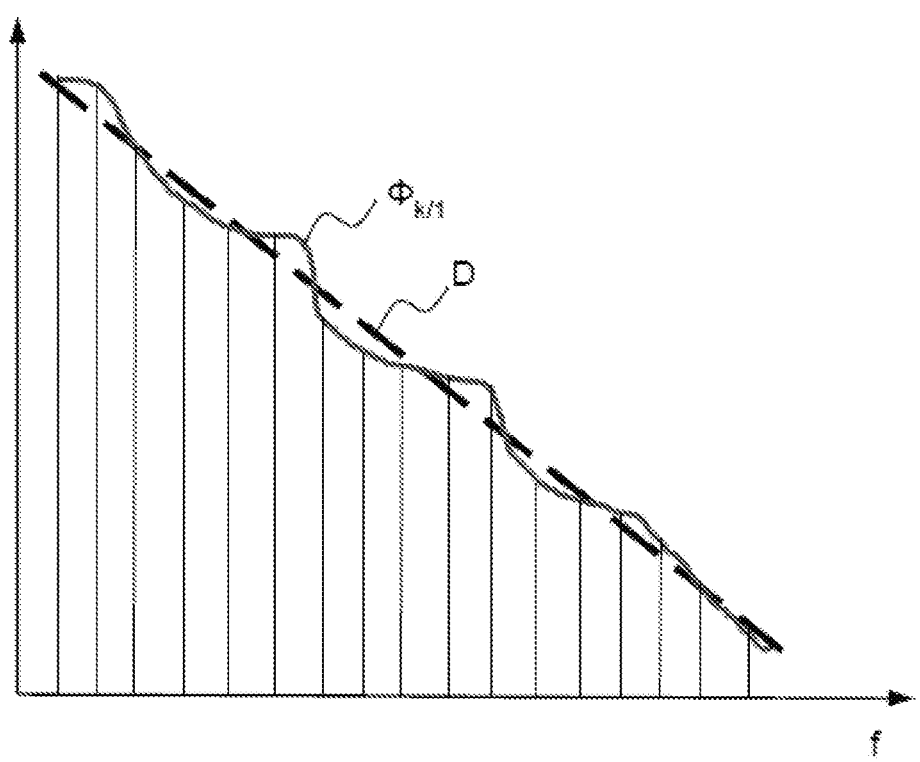
FIG. 3 shows a graph illustrating a step of the method of FIG. 2 for estimating a relative delay.

In the rest of the method, the relative delay $T_{k,1}$ common to all the frequencies of the calibration signal, and the relative phase shift $d\varphi_{k/}1$ specific to each frequency of the calibration signal are then estimated 205, 206 for the entire chain of index k relative to the reference chain. The corrective relative delay $T_{k,1}$ is determined from all of the phase values (obtained from the complex gains and after phase unwrapping) for each carrier frequency of the calibration signal. This principle is illustrated in FIG. 3, which shows, in a graph, the variation in the relative phase $\Phi_{k/}1$ of a channel of index k with respect to the reference channel as a function of frequency f. The relative phase is unwrapped based on the phases of the relative complex gains, which are expressed modulo $2\pi$. The expression "phase unwrapping" is here understood to mean the process that consists in mapping the phase based on its value modulo $2\pi$. In this way, a phase curve is produced, which can be approximated by a straight line D the equation of which is given by the following relationship, with $T_{k,1}$ the relative delay between the channel k and the reference channel and $\varphi^0_{k,1}$ the relative phase for a null frequency.

$$\varphi_{k,1}(f) = -2\pi f T_{k,1} + \varphi^0_{k,1} \quad \text{[Math. 2]}$$

The relative delay $T_{k,1}$ between the channel k and the reference channel results from the sum of the relative delay induced by the analogue radiofrequency chain and of the relative latency induced by the digital processing operations. It is determined by estimating the slope of the straight line D, which is obtained by performing a linear regression based on measurements of the unwrapped phases.

Figure 4:
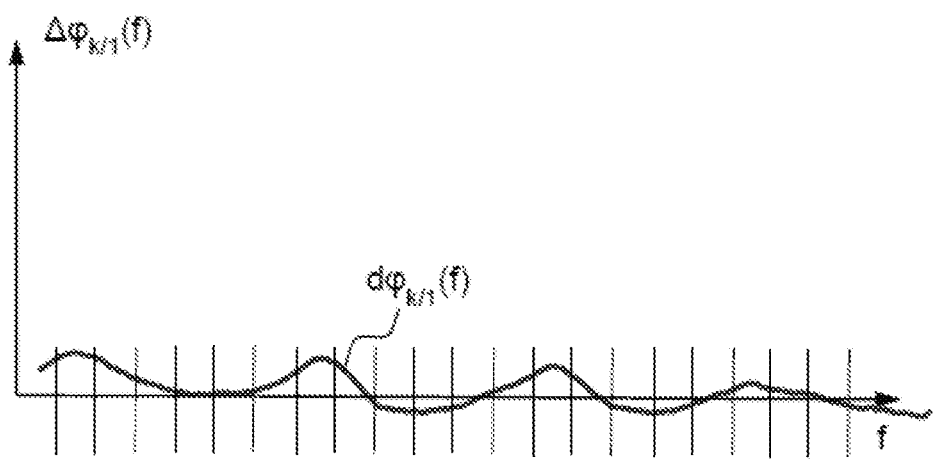
FIG. 4 shows a graph illustrating a step of the method of FIG. 2 for estimating a relative phase.

Next, the relative phase differences $d\varphi_{k/}1(f)$, as a function of frequency, between channel k and the reference channel, are determined, in a step 206, by determining the residues between the unwrapped relative phase obtained from the complex gain measurements and its approximation by the straight line D obtained by linear regression of the unwrapped relative phase. In other words, the phases corresponding to the straight line D the slope of which is equal to the relative delay are computed then subtracted from the phases $\varphi_{k/}1(f)$, for each frequency component f of the calibration signal. The relative phase differences $d\varphi_{k/}1(f)$ as a function of frequency are then obtained such as illustrated in FIG. 4. It is a matter of relative phase differences after compensation for the relative delay.

After step 206, for each channel k relative to the reference channel, the following differences are obtained: a relative delay $T_{k,1}$, a frequency-dependent relative gain $G_{k/}1(f)$, and a frequency-dependent relative phase $d\varphi_{k/}1(f)$.

Steps 203-206 are carried out, either by a computing means located on board the satellite, or by a computing means on the ground and that is interfaced with the ground station ST.

In a last step 207, corrections are determined based on the estimated differences in order to correct all the processing channels, except the reference channel, in order to marry all the channels with the reference channel.

The relative corrective gain to be applied to a channel with respect to the reference channel is determined on the basis of the moduli of the relative complex gains determined for all the frequency carriers. For example, it may be equal to the inverse of the average of the moduli if the gain does not vary as a function of frequency. Alternatively, instead of determining a single corrective relative gain to be applied to each channel, it is also possible to preserve the values of the corrective gains for each frequency and to apply a frequency-dependent corrective filter to each channel, the function of this corrective filter being to apply, to the signal, a corrective gain that varies as a function of frequency and that is the inverse of $G_{k/}1(f)$.

In the case where steps 203-206 are performed by a ground station ST, the relative corrections are transmitted to the satellite via a protected digital link.

The relative corrections are applied to each channel, except the reference channel, within the set of digital integrated circuits PN via correcting circuits $COR_1, COR_2$. One correcting circuit is produced by means of one or more digital filters configured to correct the digital signals in gain and in phase, based on the corrective relative gains and the corrective relative phase differences. The same digital filters may be employed to interpolate the signal in order to make a delay-type correction with a delay value lower than the sampling period. One correcting circuit is also produced by means of one or more delay lines or FIFO shift registers in order to correct the digital delay of each channel with respect to the reference channel, with a granularity equal to the sampling period. FIG. 1 is a purely schematic representation of the implementation of the set of digital integrated circuits PN. In an actual implementation, the arrangement and number of correcting circuits may be different from those shown in FIG. 1.

Figure 5:
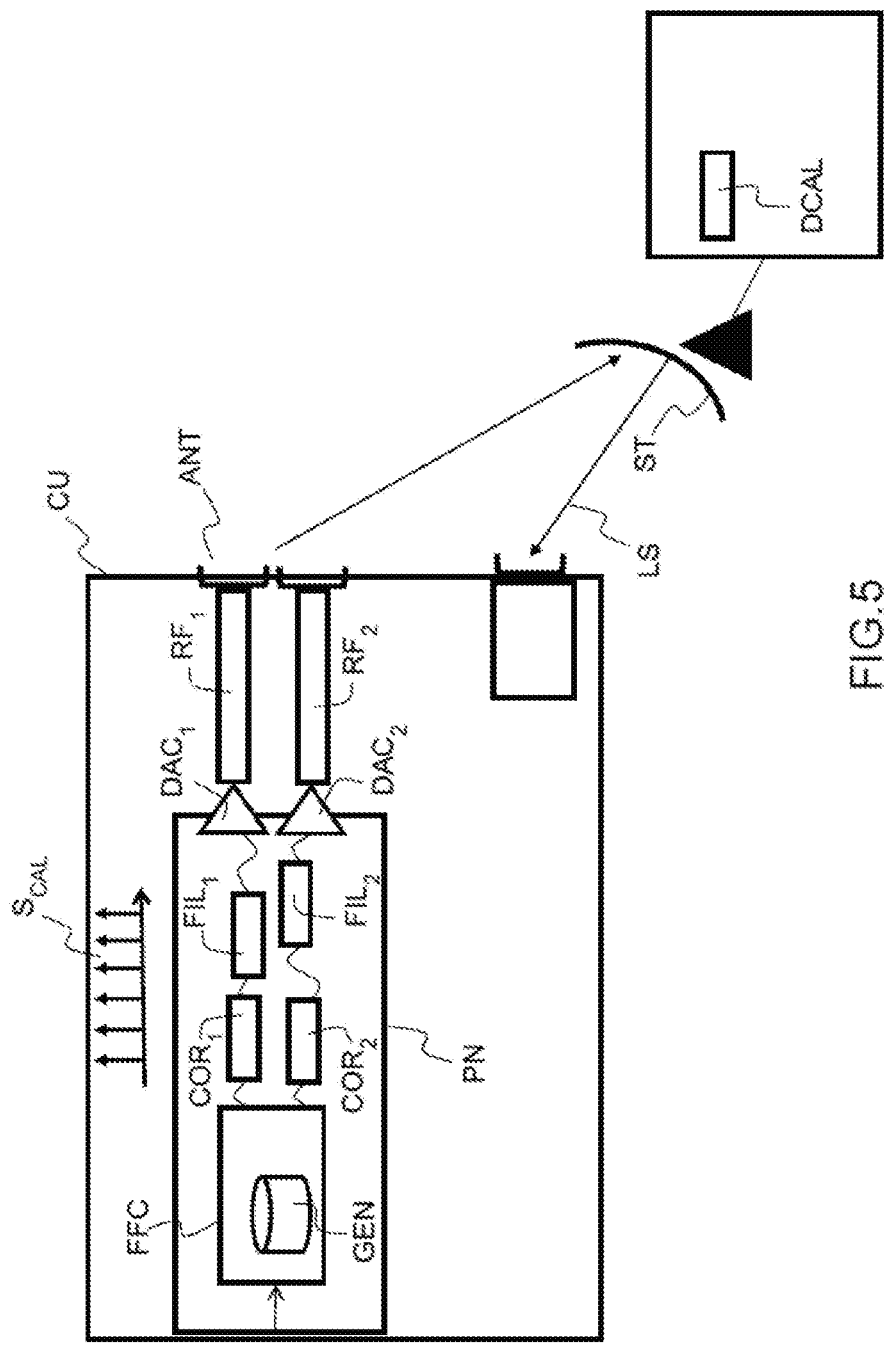
FIG. 5 shows a schematic of a system for calibrating a payload of a satellite having a transmitting antenna according to a second embodiment of the invention.
Figure 6:
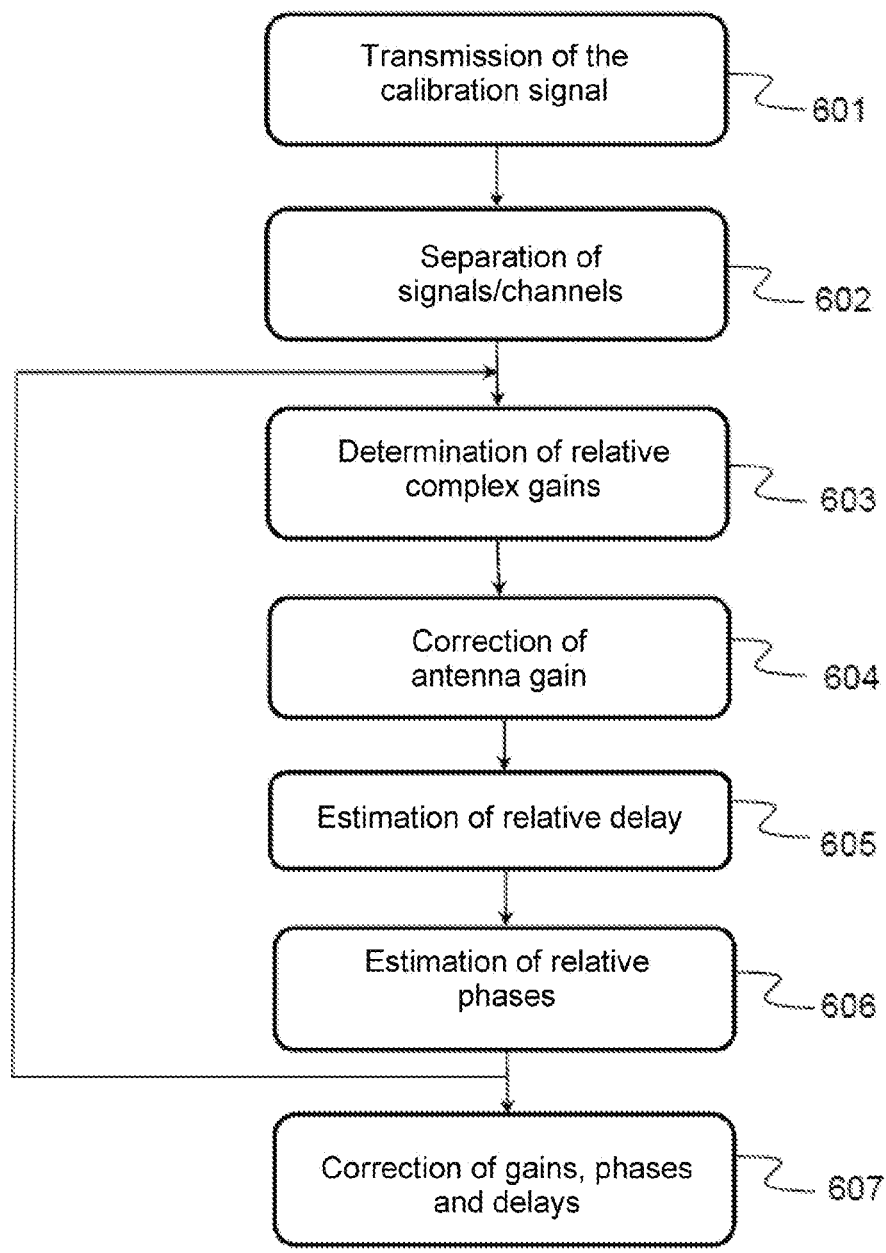
FIG. 6 shows a flowchart detailing the steps of a method for calibrating the system of FIG. 5 according to one embodiment of the invention.

FIGS. 5 and 6 illustrate the implementation of a system and method for calibrating a payload of a satellite in orbit according to a second embodiment of the invention, in which embodiment the antenna of the satellite operates as a transmitting antenna.

FIG. 5 schematically shows a calibration system according to the second embodiment of the invention. The calibration relates to a payload CU of a satellite in orbit, which payload at least transmits, i.e. transmits a signal to a ground station ST. The payload CU comprises similar elements to those described with reference to FIG. 1: in other words, a set of digital integrated circuits PN and a plurality of processing channels corresponding to a plurality of antenna elements of a transmitting antenna ANT. The set of digital integrated circuits PN comprises, for example, a beam-forming circuit FFC common to all the processing channels, and one digital filter $FIL_1, FIL_2$ per processing channel. The function of the beam-forming circuit FFC is to generate the digital signals to be transmitted with a specific gain- and phase-combination law in order to form the beams in the desired direction relative to a reference direction of the antenna and to transmit the useful signals to a ground station ST.

The output of each digital processing channel is connected to an analogue processing channel that comprises a digital-to-analogue converter $DAC_1, DAC_2$ and a radiofrequency chain $RF_1, RF_2$.

The example of FIG. 5 is given purely by way of illustration and nonlimitingly. In particular, the set of digital integrated circuits PN may have a modular architecture different from that of FIG. 5. For example, it may comprise a plurality of series of digital integrated circuits for each channel or a plurality of beam-forming integrated circuits operating in parallel and in cascade for subgroups of channels.

In any given architecture, the set of digital integrated circuits comprises a means GEN for generating digital calibration signals synchronously for all the channels, in the first digital integrated circuit that starts the transmission-mode beam-forming processing, or in a section of a set of circuits that operate coherently, this set of circuits including the first circuit that starts the beam forming. In the example of FIG. 5, the first digital integrated circuit is the only beam-forming circuit FFC. The means GEN may consist in a memory in which calibration signals defined beforehand are saved.

The method for calibrating a satellite payload CU operating in transmission to the ground is detailed in the flow chart of FIG. 6.

In a first step 601, the calibration signal is generated digitally and synchronously for all the channels, relative to the input of the transmission-mode beam-forming function, in the set of digital integrated circuits PN, then transmitted, via the processing channels of the payload CU and the antenna ANT, to the ground station ST. The calibration signal $S_{CAL}$ is similar to that described for the method of FIG. 2, i.e. a signal comprising a plurality of frequency carriers, which are modulated by a predefined signal or not modulated, and distributed over the useful band. The frequency difference between two adjacent carriers of the signal $S_{CAL}$ is smaller than a threshold $\Delta f$ related to the maximum relative delay between the channels, in the same way as for the reception-mode case. For a maximum relative delay $\Delta \tau$, the threshold $\Delta f$ is that given by the relationship [Math.1] introduced above.

When the ground station ST receives the signal, it initially carries out a step 602 of separating the signals transmitted by the various transmission channels of the payload CU. This step 602 will be described in more detail below.

At the end of step 602, the ground station has derived a set of synchronous digital sample sequences corresponding to the received respective contributions of the different transmission channels of the payload CU emitting simultaneously the calibration signal.

Steps 603-607 of the calibration method are then identical to steps 203-207 described with reference to FIG. 2. They are implemented by a digital calibration device DCAL located in the ground station in order to determine the relative corrections for each transmission channel of the payload, these corrections then being achieved in the set of digital integrated circuits by means of correcting circuits $COR_1, COR_2$. The corrections are transmitted to the satellite via a secure link LS.

Step 602 separating the signals transmitted by the various transmission channels of the payload CU will now be described.

In order to be able to apply the steps 603-606 of estimating the differences between each channel and a reference channel, it is necessary beforehand to be able to separate the signals transmitted by the various transmission channels based on the signal received by the ground station ST, which is a combination or superposition of the signals transmitted by the various channels.

Known solutions employ multiple access techniques such as CDMA, using orthogonal codes or quasi-orthogonal PN sequences, or such as TDMA with sequential transmissions.

A first solution, of synchronous CDMA type, for carrying out step 602 consists in modulating each carrier of the digital calibration signal in the set of digital integrated circuits PN with orthogonal spreading codes, for example Walsh-Hadamard codes, that are different for each processing channel. Thus, each antenna element transmits a signal with a different spreading code. On reception of the signal on the ground, a step of despreading with a local replica of each of the spreading codes used on transmission allows the signals transmitted on the various transmission channels to be extracted.

One drawback of this method is that the various processing channels of the payload CU are generally not rigorously synchronous since they may introduce, in particular, different delays. Thus, the orthogonality of the codes is no longer guaranteed on transmission and therefore on reception. The separation of the signals on the ground will be degraded because of interference with the other coded signals.

Another solution, of asynchronous CDMA type, consists in modulating each carrier of the calibration signal with pseudo-random PN sequences, which allows an intermediate level of orthogonality to be achieved without synchronization constraints. This solution is less sensitive to problems with synchronization but still leads to interference between signals.

Thus, the performance of these two synchronous and asynchronous CDMA solutions for separating signals is suboptimal.

Another solution, of TDMA type, consists in transmitting the calibration signals on each transmission channel during successive time intervals. Thus, the signals are temporally separated. However, this solution has the drawback of comparing the signals generated in different time intervals, during which the propagation conditions over the downlink between the satellite and the ground station may vary. In addition, any phase measurement requires a reference signal of the same frequency as the measured signal. Conventional techniques for generating a reference signal of the same frequency consist either in estimating the frequency and in synthesizing this frequency, or in locking a phase-locked loop (PLL) to the received signal to be measured. Any error in the estimation of the frequency, of the synthesized frequency, or of the drift in the PLL loop in the absence of a pilot signal, leads to a drift in the phase of the reference signal, this degrading the precision of the phase measurements. This type of TDMA solution for separating the signals is not precise enough.

Another solution is proposed for carrying out step 602. It is described with reference to FIGS. 7 to 10.

This solution is based on the generation of auxiliary signals in addition to the calibration signal, so as to be able to generate on the ground a reference signal, from the auxiliary signals, of rigorously the same frequency as the calibration signal.

Figure 7:
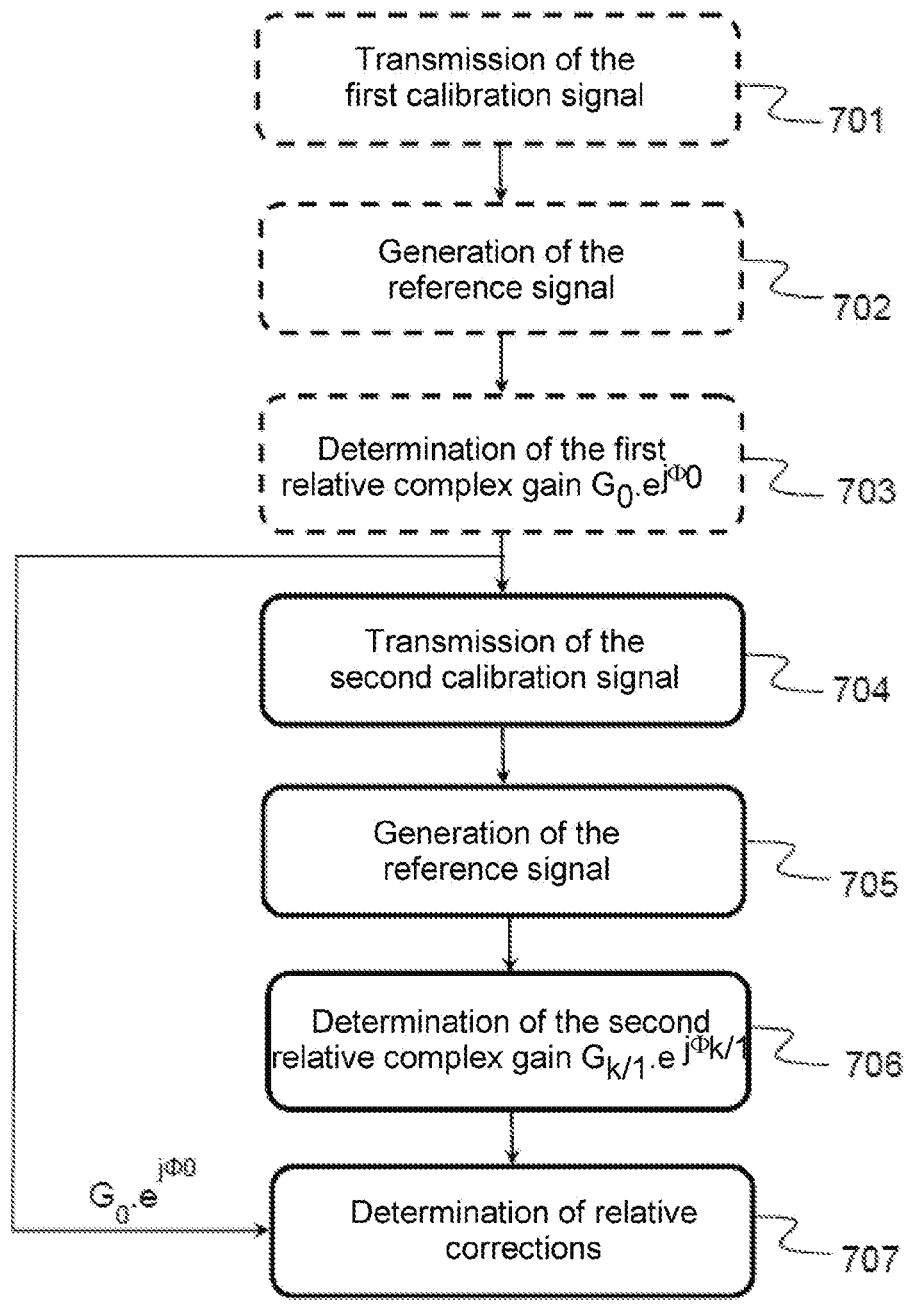
FIG. 7 shows a flowchart describing the steps of one particular variant embodiment of the invention.

FIG. 7 shows, in a flowchart, the main steps of implementation of step 602 of separating signals.

In this variant embodiment of the invention, the calibration signal is again considered to consist of a plurality of frequency carriers distributed over the useful frequency band. Moreover, two auxiliary signals are generated, one being derived from the calibration signal.

Figure 8:
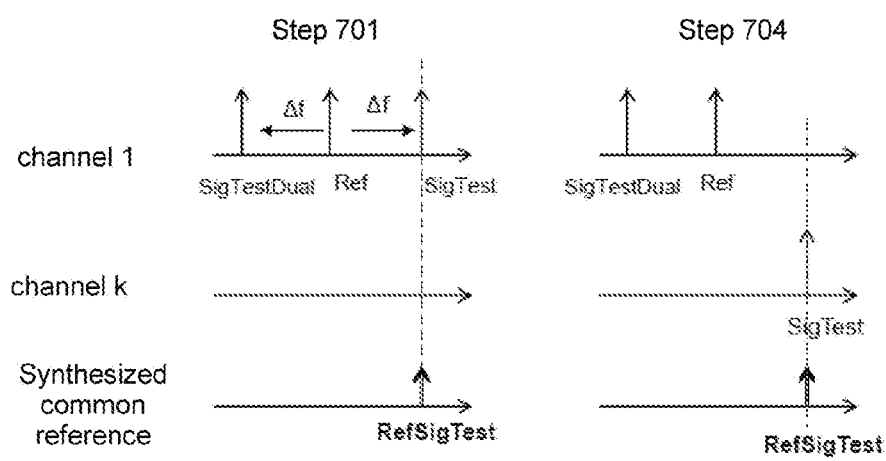
FIG. 8 shows a graph illustrating the exploitation of one particular calibration signal with auxiliary signals.

The generation of the auxiliary signals is shown in FIG. 8. In a first variant, each of the two auxiliary signals is formed with as many carrier frequencies as the calibration signal, each of the carriers of an auxiliary signal being determined from a respective carrier of the calibration signal. In a second variant, each of the two auxiliary signals consists of a set of carriers that may optionally be as small as one carrier. The carriers of the calibration signal and of the two auxiliary signals do not overlap, in order to be able to be extracted separately by filtering by the ground station ST.

FIG. 8 schematically shows a carrier SigTest of the calibration signal and two corresponding carriers Ref, SigTestDual of the two auxiliary signals. The frequency spacing between the carriers Ref, SigTestDual of the two auxiliary signals is identical to the spacing between the carrier Ref and the carrier SigTest of the calibration signal.

Without departing from the scope of the invention, other auxiliary signals may be generated instead of the two auxiliary signals described with reference to FIG. 8. The general relationship that binds the corresponding carrier frequencies of the two auxiliary signals and of the calibration signal is:

$N.F_{SigTestDual} = M.F_{Ref} + P.F_{SigTest}$ with $F_{SigTest}$ the carrier frequency of the calibration signal and $F_{SigTestDual}$ and $F_{ref}$ the carrier frequencies of the auxiliary signals. N, M and P are relative integers. The invention may also be generalized to more than two auxiliary signals.

One particular case of the above relationship makes it possible to avoid generating intermodulation products at the frequency of the calibration signal, these potentially resulting from the nonlinearities of an amplifier for example. This particular case is achieved with an even value of P and odd values of N and M.

The auxiliary signals are generated in the set of digital integrated circuits with the calibration signal or are computed beforehand and saved in a memory with the calibration signal.

In a first step 701, the two auxiliary signals and the calibration signal are transmitted solely by the reference channel of the payload. They are received by the ground station, which carries out a filtering operation in order to separate the three respective carriers of the three signals. The following steps are iterated for all the carriers of the calibration signal, sequentially or in parallel. In other words, for each carrier of the calibration signal, the corresponding carriers of the two auxiliary signals are recovered by filtering.

Next, for each carrier of the calibration signal, the ground station ST generates, in a step 702, a reference signal RefSigTest at the same frequency as the carrier of the received calibration signal SigTest, on the basis of the received auxiliary signals SigTestDual and Ref. Specifically, one of the two auxiliary signals being generated from the calibration signal, and from the other auxiliary signal, it is possible, on reception, to generate a signal at the same frequency as the calibration signal from the two auxiliary signals, via frequency filtering, mixing, frequency multiplication and division processing operations.

Next, the ground station determines 703 a first relative complex gain $G_{1/ref1}.e^{j\varphi 1/ref1}$ between the received calibration signal SigTest and the reference signal RefSigTest generated on the ground of same frequency. The relative complex gain is obtained by computing the intercorrelation between the two signals in the way described with respect to step 203.

This relative complex gain $G_{1/ref1}.e^{j\varphi 1/ref1}$ bears the gain and phase differences associated with the reference chain of the payload at the frequencies of the auxiliary signals and at the frequency of the calibration signal. Specifically, the behaviour of the analogue radiofrequency chains is not identical for all the frequencies.

In one variant embodiment, the aforementioned steps 701-703 are made optional if the frequency dependence of the effect of the analogue radiofrequency chains is neglected.

Next, in a new step 704, the payload transmits simultaneously, in a new time interval, the calibration signal SigTest on a channel k other than the reference channel and the auxiliary signals SigTestDual and Ref on the reference channel.

The ground station ST generates 705 the reference signal RefSigTest from the two received auxiliary signals SigTestDual and Ref.

Next, a second relative complex gain $G_{k/ref1}.e^{j\varphi k/ref1}$ between the received calibration signal SigTest and the reference signal RefSigTest generated on the ground is determined 706 still by computing the intercorrelation between the two signals.

The second relative complex gain contains the contributions in gain and in phase of the channel k with respect to the reference channel, but at other frequencies, since the reference signal is generated from auxiliary signals transmitted on the reference channel. The two auxiliary signals experience the same propagation conditions as the calibration signal. The effect of the propagation conditions on the downlink between the satellite and the ground is naturally compensated for by computing the intercorrelation between the received calibration signal SigTest and the reference signal RefSigTest generated on the ground, which are affected in the same way by the propagation conditions, the intercorrelation result being a relative measurement.

In a last step 707, the relative complex gain introduced in step 603 of the calibration method is determined by determining the ratio of the first and second complex gains determined in steps 703 and 706, in order to correct for the effects of the analogue radiofrequency chains on the auxiliary signals. If step 703 is not carried out, the final relative complex gain of step 603 is equal to the second gain $G_{k/ref1}.e^{j\varphi k/ref1}$.

Step 701 to 707 are carried out for all the frequencies of the calibration signal.

Steps 704-707 are iterated for all the processing channels other than the reference channel, i.e. by changing, in each iteration, the index k of the channel on which the calibration signal is transmitted in step 704.

The method described with reference to FIGS. 7 and 8 has the advantage of allowing a comparison between a calibration signal transmitted over a transmission channel k and a reference signal of rigorously the same frequency generated on the ground based on reception of auxiliary signals transmitted over a reference channel at separate frequencies. In this way, it is possible to compare signals at the same frequency without them being transmitted simultaneously, which would not be possible without mutual interference.

Figure 9:
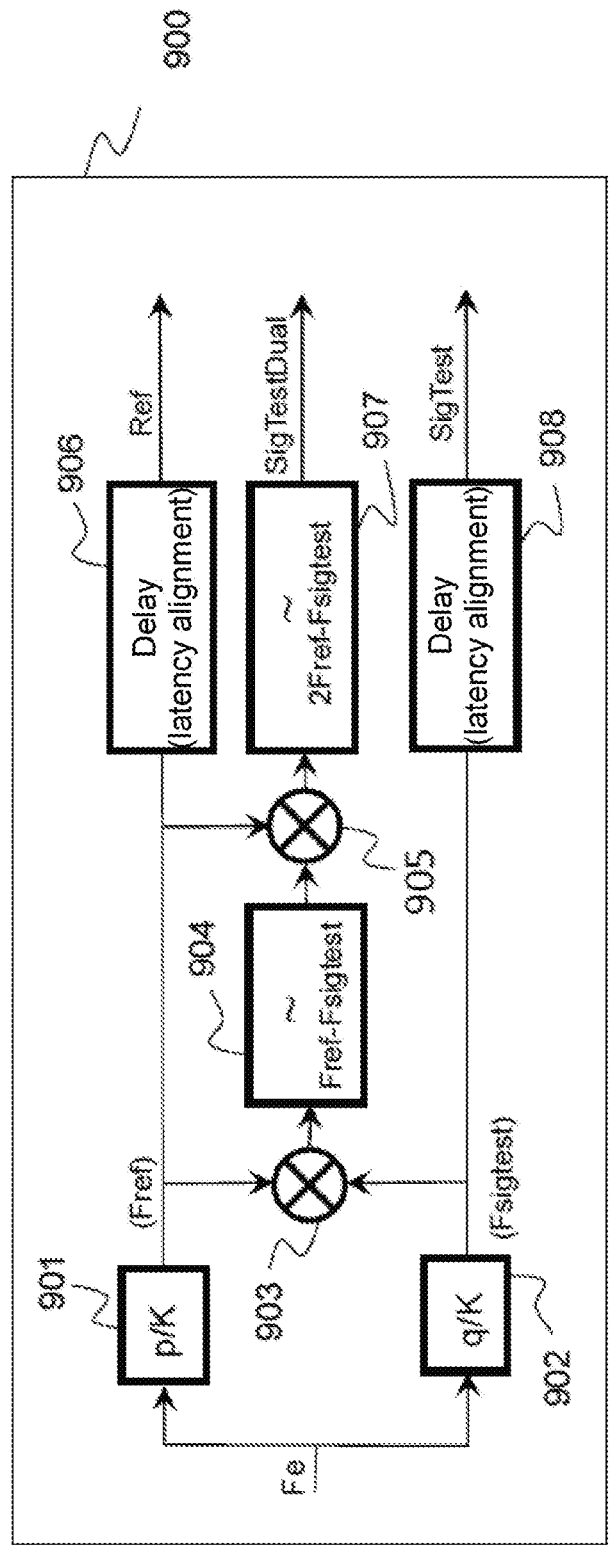
FIG. 9 shows an overview of a device allowing to generate the particular calibration signal of FIG. 8.

FIG. 9 illustrates, via a diagram, an example of a device for generating the auxiliary signal SigTestDual from an auxiliary signal Ref and from the calibration signal SigTest.

The device 900 of FIG. 9 generates, based on a signal at a clock frequency Fe and on two fractional frequency multipliers 901,902, the calibration signal SigTest and the first auxiliary signal Ref. A mixer 903 followed by a filter 904 allows a signal that beats at a frequency given by the difference $F_{ref}-F_{sigtest}$ between the respective frequencies of the two aforementioned signals to be generated. This difference beat is mixed with the first auxiliary signal Ref via a second mixer 905 followed by a filter 907, in order to generate a sum beat corresponding to the signal SigTestDual at the frequency $2F_{ref}-F_{sigtest}$. The device 900 furthermore comprises delay lines or shift registers 906,908 for aligning the generation latencies of the auxiliary signals Ref, SigTestDual and of the calibration signal SigTest output from the device 900.

The device 900 may be implemented in the set of digital integrated circuits PN of the payload CU or it may be used on the ground to generate signals that are then tabulated in programmable memories on board the payload.

Figure 10:
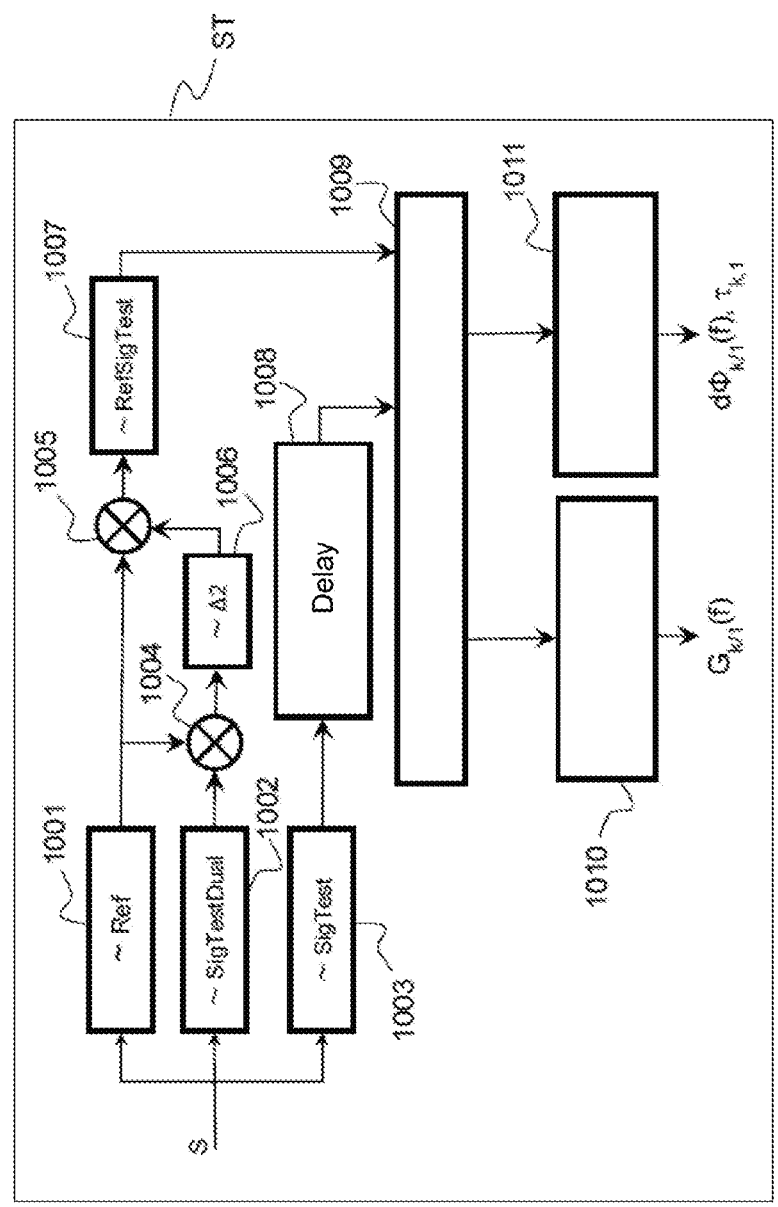
FIG. 10 shows an overview of a device allowing the calibration to be carried out on the basis of the particular calibration signal.

FIG. 10 schematically shows an example of an embodiment of the processing carried out in the ground station ST and illustrated in FIG. 7.

The ground station ST comprises a plurality of filter banks 1001, 1002,1003 configured to filter the received signal S around the respective frequencies of the auxiliary signals Ref and SigTestDual and of the calibration signal SigTest.

The reference signal RefSigTest is derived using the two filtered auxiliary signals Ref and SigTestDual, two mixers 1004,1005, a filter 1006 at the frequency of the difference beat between the two auxiliary signals and another filter 1007 at the frequency of the calibration signal SigTest.

A delay line or shift register 1008 allows the latency of extraction of the calibration signal SigTest to be aligned with the latency of generation of the reference signal RefSigTest, so that they may then be compared by means of a complex gain estimator 1009 configured to carry out steps 703 and 706 of determining the relative complex gains by correlation.

Lastly, one or more modules 1010,1011 are configured to determine the relative differences in gain $G_{k/}1(f)$, phase $d\varphi_{k/}1(f)$ and delay $T_{k,1}$ from the complex gains computed by the module 1009.

These differences, which are estimated on the ground, allow to determine corrections in gain, in phase and in delay, which are transmitted to the payload via a protected digital link.

The corrections are made within the set of digital integrated circuits PN.

The invention claimed is:

1. A system for calibrating a payload of a satellite, the payload (CU) comprising a multichannel receiver comprising one antenna (ANT) per channel, one analogue processing chain (RF1, RF2) per channel and a set of digital integrated circuits (DIC), the system comprising a calibration device (DCAL) implemented in the payload (CU) or in a ground station (ST), the calibration device (DCAL) being configured to:
 acquire for all the channels of the receiver, a digitized calibration signal,
 set a reference channel and, for each of the other channels, determine a relative complex gain between the channel and the reference channel, for a plurality of frequencies of the calibration signal,
 compensate the relative complex gain with a relative gain of the antenna (ANT) of the satellite between the channel and the reference channel to obtain a modified complex gain having a modified phase,
 estimate, from the modified phase, which phase is evaluated for a set of frequencies, a relative propagation delay of the calibration signal,
 estimate, from the modified phase, which phase is evaluated for a set of frequencies, and from the relative delay, a relative phase difference for the set of frequencies,
 deliver the modified amplitude of the complex gain, the estimated relative phase difference, and the estimated relative propagation delay of the channel with respect to the reference channel for a set of frequencies, in view of correcting the channels.

2. The calibration system according to claim 1, wherein the calibration device (DCAL) is configured to receive, for each reception channel, a digitized sample sequence of a calibration signal received by the satellite, the sample sequence being acquired in the set of digital integrated circuits (DIC) in all of the channels, the sample sequence being acquired in a given time interval for at least one subset of the channels.

3. The calibration system according to claim 2, wherein the calibration device (DCAL) is implemented in the ground station (ST), the system furthermore comprising the payload (CU), the payload (CU) being configured to receive a calibration signal, the set of digital integrated circuits (DIC) being configured to acquire, for each channel, the digital sample sequence of the calibration signal and to correct the relative gain, phase and delay of the channel with respect to the reference channel.

4. The calibration system according to claim 3, wherein the set of digital integrated circuits (DIC) comprises a subset of digital integrated circuits (FIL1 FIL2, FFC) performing a beam-forming function across all of the channels, the set of digital integrated circuits (DIC) being configured to acquire the digital sample sequence of the calibration signal in the last digital integrated circuit (FFC) of the subset in the direction of propagation of the signal, which is a common path for all of the channels.

5. The calibration system according to claim 2, wherein the calibration device (DCAL) is implemented in the payload (CU).

6. The calibration system according to claim 1, wherein the calibration signal is composed of a plurality of frequency carriers.

7. The calibration system according to claim 1, wherein the relative propagation delay is estimated from the slope of a regression line obtained by performing a linear regression based on the unwrapping of the modified phase.

8. The calibration system according to claim 7, wherein the relative phase difference is estimated by determining the deviations between the unwrapped modified phase and the regression line.

9. A system for calibrating a payload of a satellite, the payload (CU) comprising a multichannel emitter comprising one antenna (ANT) per channel, one analogue processing chain (RF1, RF2) per channel and a set of digital integrated circuits (DIC), the system comprising a calibration device (DCAL) implemented in a ground station (ST), the calibration device (DCAL) being configured to:

separate the calibration signal received on the ground into a plurality of signals corresponding to the signals emitted by the transmission channels of the satellite, acquire for all the channels of the emitter, a digitized calibration signal, set a reference channel and, for each of the other channels,
determine a relative complex gain between the channel and the reference channel, for a plurality of frequencies of the calibration signal, compensate the relative complex gain with a relative gain of the antenna (ANT) of the satellite between the channel and the reference channel to obtain a modified complex gain having a modified phase, estimate, from the modified phase, which phase is evaluated for a set of frequencies, a relative propagation delay of the calibration signal, estimate, from the modified phase, which phase is evaluated for a set of frequencies, and from the relative delay, a relative phase difference for the set of frequencies, deliver the modified amplitude of the complex gain, the estimated relative phase difference and the estimated relative propagation delay of the channel with respect to the reference channel for a set of frequencies, in view of correcting the channels.

10. The calibration system according to claim 9, furthermore comprising the payload, the payload being configured to generate the calibration signal in the set of digital integrated circuits (DIC), transmit the calibration signal from the satellite to the ground station (ST), correct, in the set of digital integrated circuits (DIC), the relative gain, phase and delay of the channel with respect to the reference channel.

11. The calibration system according to claim 10, wherein the set of digital integrated circuits comprises a subset of digital circuits (FFC, FIL1 FIL2) performing a beam-forming function across all of the channels, the set of digital integrated circuits (DIC) being configured to generate the calibration signal in the first digital integrated circuit (FFC) of the subset in the direction of propagation of the signal, which is a common path for all of the channels.

12. The calibration system according to claim 10, wherein:

the payload (CU) is furthermore configured to generate at least two auxiliary signals (Ref, SigTestDual) each comprising at least one frequency carrier different from the frequencies of the calibration signal (SigTest) and different from the frequencies of the other auxiliary signals, an auxiliary signal (SigTestDual) being generated from the calibration signal (SigTest) and from another auxiliary signal (Ref), the calibration device (DCAL) is configured to:
for each channel other than the reference channel, receive the at least two auxiliary signals (Ref, SigTestDual) transmitted on the reference channel and the calibration signal transmitted on the channel (SigTest), generate a reference signal (RefSigTest) of frequencies identical to the frequencies of the calibration signal (SigTest), the reference signal being generated from the at least two received auxiliary signals (Ref, SigTestDual) and determine a relative complex gain (Gk/ref1.ej$\varphi$k/ref1) between the received calibration signal (SigTest) and the reference signal (RefSigTest).

13. The calibrating system according to claim 12, wherein the calibration device (DCAL) is furthermore configured to, in a prior step:

receive the at least two auxiliary signals (Ref, SigTestDual) and the calibration signal (SigTest) transmitted on the reference channel, generate a first reference signal (RefSigTest) of frequencies identical to the frequencies of the calibration signal (SigTest), the reference signal being generated from the at least two received auxiliary signals (Ref, SigTestDual), determine a corrective relative complex gain (G1/ref1.ej$\varphi$1/ref1) between the calibration signal (SigTest) received in the prior step and the first reference signal (RefSigTest), for each channel other than the reference channel, correct the relative complex gain using the corrective relative complex gain (G1/ref1.ej$\varphi$1/ref1).

14. The calibration system according to claim 9, wherein the calibration signal is composed of a plurality of frequency carriers.

15. The calibration system according to claim 9, wherein the relative propagation delay is estimated from the slope of a regression line obtained by performing a linear regression based on the unwrapping of the modified phase.

16. The calibration system according to claim 15, wherein the relative phase difference is estimated by determining the deviations between the unwrapped modified phase and the regression line.

* * * * *